United States Patent
Blass et al.

(10) Patent No.: US 11,599,644 B2
(45) Date of Patent: Mar. 7, 2023

(54) BLOCKING INSECURE CODE WITH LOCKING

(71) Applicant: Walmart Apollo, LLC, Bentonville, AR (US)

(72) Inventors: Oscar Blass, Bentonville, AR (US); Johnny Ray Cook, Philadelphia, MS (US); Austin Chase Lucas, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 371 days.

(21) Appl. No.: 16/874,849

(22) Filed: May 15, 2020

(65) Prior Publication Data

US 2020/0364348 A1 Nov. 19, 2020

Related U.S. Application Data

(60) Provisional application No. 62/849,336, filed on May 17, 2019.

(51) Int. Cl.
*G06F 21/57* (2013.01)
*G06F 8/70* (2018.01)

(52) U.S. Cl.
CPC .............. *G06F 21/577* (2013.01); *G06F 8/70* (2013.01); *G06F 2221/034* (2013.01)

(58) Field of Classification Search
CPC ........ G06F 21/125; G06F 21/14; G06F 21/57; G06F 21/577; G06F 8/36; G06F 8/40; G06F 8/70; G06F 2221/033; G06F 2221/034
See application file for complete search history.

(56) References Cited

U.S. PATENT DOCUMENTS

| | | |
|---|---|---|
| 4,726,018 A | 2/1988 | Bux et al. |
| 4,949,337 A | 8/1990 | Aggers et al. |

(Continued)

FOREIGN PATENT DOCUMENTS

| | | |
|---|---|---|
| CN | 105095769 A | 11/2015 |
| EP | 2618541 A1 | 7/2013 |

OTHER PUBLICATIONS

International Search Report and Written Opinion, Application No. PCT/US2017/034633, dated Aug. 14, 2017, 12 pages.

(Continued)

*Primary Examiner* — Eric W Shepperd
(74) *Attorney, Agent, or Firm* — Patterson Thuente, P.A.

(57) ABSTRACT

Systems and methods for preventing vulnerable software assets from being deployed by modifying the underlying source code in such a way that a build of the software asset will fail. In one aspect of the present disclosure, a system for securing software artifacts in a repository comprises a repository interface communicably coupleable to a software repository to retrieve an original artifact usable for building a software asset, and to replace the original artifact in the software repository with a modified artifact. A security scanner is configured to initiate a security scan of the original artifact and produce an output indicating the presence of a security vulnerability in the original artifact. An encoder is configured to reversibly modify the original artifact to produce the modified artifact, the modified artifact unusable for building the software asset.

19 Claims, 5 Drawing Sheets

(56) References Cited

U.S. PATENT DOCUMENTS

| | | | |
|---|---|---|---|
| 5,043,981 A | 8/1991 | Firoozmand et al. | |
| 5,596,576 A | 1/1997 | Milito | |
| 5,878,408 A | 3/1999 | Van Huben et al. | |
| 6,151,608 A | 11/2000 | Abrams | |
| 6,256,635 B1 | 7/2001 | Arrouye et al. | |
| 6,523,027 B1 | 2/2003 | Underwood | |
| 6,615,253 B1 | 9/2003 | Owman-Amuah | |
| 6,965,933 B2 | 11/2005 | Haartsen | |
| 7,110,411 B2 | 9/2006 | Saidi et al. | |
| 7,379,996 B2 | 5/2008 | Papatla et al. | |
| 7,409,460 B1 | 8/2008 | Li | |
| 7,552,358 B1 | 6/2009 | Asgar-Deen et al. | |
| 7,580,970 B1 | 8/2009 | Bank et al. | |
| 7,631,131 B2 | 12/2009 | Chen | |
| 7,797,279 B1 | 9/2010 | Starling et al. | |
| 7,797,404 B1 | 9/2010 | Knight | |
| 7,872,968 B2 | 1/2011 | Gorti et al. | |
| 7,917,617 B1 | 3/2011 | Pannapur et al. | |
| 8,051,172 B2 | 11/2011 | Sampson | |
| 8,060,679 B2 | 11/2011 | Nozaki et al. | |
| 8,214,353 B2 | 7/2012 | Inturi et al. | |
| 8,285,684 B2 | 10/2012 | Prahlad et al. | |
| 8,442,949 B1 | 5/2013 | Gunda et al. | |
| 8,553,538 B2 | 10/2013 | Nishimura | |
| 8,881,139 B1 | 11/2014 | Acacio | |
| 8,887,260 B2 | 11/2014 | Marcotte | |
| 8,943,423 B2 * | 1/2015 | Merrill | G06F 8/34 717/124 |
| 8,977,594 B2 | 3/2015 | Whitehead et al. | |
| 9,043,924 B2 | 5/2015 | Maor et al. | |
| 9,098,364 B2 | 8/2015 | Davis | |
| 9,201,883 B1 | 12/2015 | Stickle | |
| 9,208,316 B1 * | 12/2015 | Hill | H04L 63/1416 |
| 9,258,262 B2 | 2/2016 | Watt et al. | |
| 9,405,597 B1 | 8/2016 | Luff et al. | |
| 9,483,248 B2 | 11/2016 | Ramasamy | |
| 9,600,545 B2 | 3/2017 | Pryce et al. | |
| 9,600,672 B1 * | 3/2017 | Ramalingam | G06F 21/577 |
| 9,720,657 B2 * | 8/2017 | Bates | G06F 8/73 |
| 9,990,499 B2 | 6/2018 | Chan et al. | |
| 10,031,961 B1 | 7/2018 | Wang et al. | |
| 10,459,822 B1 * | 10/2019 | Gondi | G06F 8/75 |
| 10,587,526 B2 | 3/2020 | Sinha et al. | |
| 10,628,584 B1 * | 4/2020 | Norton | G06F 21/563 |
| 2001/0033581 A1 | 10/2001 | Kawarai et al. | |
| 2002/0129096 A1 | 9/2002 | Mansour et al. | |
| 2003/0046441 A1 | 3/2003 | Rau et al. | |
| 2003/0172189 A1 | 9/2003 | Greenblat | |
| 2004/0122865 A1 | 6/2004 | Stahl et al. | |
| 2004/0218604 A1 | 11/2004 | Porter | |
| 2004/0264486 A1 | 12/2004 | Sankey et al. | |
| 2005/0058149 A1 | 3/2005 | Howe | |
| 2005/0091240 A1 | 4/2005 | Berkowitz et al. | |
| 2005/0120102 A1 | 6/2005 | Gandhi | |
| 2005/0149627 A1 | 7/2005 | Schreter | |
| 2006/0015566 A1 | 1/2006 | Sampson | |
| 2006/0059253 A1 | 3/2006 | Goodman et al. | |
| 2007/0112834 A1 | 5/2007 | Farr et al. | |
| 2007/0133407 A1 | 6/2007 | Choi | |
| 2007/0174883 A1 | 7/2007 | McEnroe | |
| 2007/0180112 A1 | 8/2007 | McEnroe | |
| 2007/0294447 A1 | 12/2007 | Nazaki et al. | |
| 2009/0296729 A1 | 12/2009 | Urano et al. | |
| 2010/0024012 A1 | 1/2010 | Devine et al. | |
| 2010/0083240 A1 * | 4/2010 | Siman | G06F 16/245 717/144 |
| 2010/0100952 A1 | 4/2010 | Sample | |
| 2010/0208614 A1 | 8/2010 | Harmatos | |
| 2010/0278190 A1 | 11/2010 | Yip et al. | |
| 2010/0325620 A1 * | 12/2010 | Rohde | G06F 11/3604 717/154 |
| 2011/0320915 A1 | 12/2011 | Khan | |
| 2012/0124168 A1 | 5/2012 | Boerger et al. | |
| 2012/0195324 A1 | 8/2012 | Raghuraman | |
| 2013/0044745 A1 | 2/2013 | Imamura | |
| 2013/0179553 A1 | 7/2013 | Elko et al. | |
| 2014/0053273 A1 * | 2/2014 | Stella | G06F 21/577 726/25 |
| 2014/0121861 A1 | 5/2014 | Mood et al. | |
| 2014/0123312 A1 | 5/2014 | Marcotte | |
| 2014/0181040 A1 | 6/2014 | Montulli et al. | |
| 2014/0208431 A1 * | 7/2014 | Archer | G06F 21/577 726/25 |
| 2014/0355442 A1 | 12/2014 | Isobe | |
| 2014/0372516 A1 | 12/2014 | Watte et al. | |
| 2014/0379910 A1 | 12/2014 | Saxena | |
| 2015/0019195 A1 | 1/2015 | Davis | |
| 2015/0019488 A1 | 1/2015 | Higginson et al. | |
| 2015/0113549 A1 | 4/2015 | Wolf | |
| 2015/0212896 A1 | 7/2015 | Pawar et al. | |
| 2015/0220372 A1 * | 8/2015 | Ban | G06F 9/528 710/200 |
| 2015/0249588 A1 | 9/2015 | Leon et al. | |
| 2015/0271014 A1 | 9/2015 | Madama | |
| 2015/0304110 A1 | 10/2015 | Oberhelde et al. | |
| 2015/0304417 A1 | 10/2015 | Tan | |
| 2016/0180096 A1 * | 6/2016 | Sharma | G06F 21/577 726/25 |
| 2016/0182693 A1 | 6/2016 | Ferguson et al. | |
| 2016/0188377 A1 | 6/2016 | Thimmappa et al. | |
| 2016/0323378 A1 | 11/2016 | Coskun et al. | |
| 2017/0126908 A1 | 5/2017 | Ahmadyar | |
| 2017/0169059 A1 | 6/2017 | Horowitz et al. | |
| 2017/0171021 A1 | 6/2017 | Angaluri et al. | |
| 2017/0351511 A1 * | 12/2017 | Bar-Or | G06F 8/34 |
| 2018/0032593 A1 | 2/2018 | Ledbetter et al. | |
| 2018/0096043 A1 | 4/2018 | Ledbetter et al. | |
| 2018/0293386 A1 * | 10/2018 | Barouni Ebrahimi | G06F 8/70 |
| 2018/0336356 A1 * | 11/2018 | Papaxenopoulos | G06F 8/65 |
| 2019/0250893 A1 * | 8/2019 | Pandit | G06N 20/00 |

OTHER PUBLICATIONS

International Search Report and Written Opinion for PCT Application No. PCT/US2017/051547, dated Dec. 5, 2017, 12 pages.

Notification of the Preliminary Report on Patentability for Corresponding PCT Application No. PCT/US2017/043872, dated Feb. 2, 2019, 7 pages.

International Search Report and Written Opinion for corresponding International Application No. PCT/2017/043872 dated Oct. 20, 2017; 12 pages.

"Advanced Upgrade and Database Migration"; https://scl.checkpoint.com/documents/R76/CP_R76_Installation_and_Upgrade_Guide-webAdmin/16535.htm 12 pages, retrieved May 24, 2016.

"Transferring Data Between Plesk Servers" 2 pages, retrieved May 24, 2016.

* cited by examiner

BLOCKING INSECURE CODE WITH LOCKING

CROSS-REFERENCE TO RELATED APPLICATIONS

The present application claims benefit of U.S. Provisional Patent Application No. 62/849,336 filed May 17, 2019, which is hereby incorporated by reference in its entirety.

TECHNICAL FIELD

Embodiments of the present disclosure relate generally to the field of automated software development tools, and more particularly to tools for detecting security vulnerabilities in software artifacts.

BACKGROUND

Software security vulnerabilities can enable attackers to disrupt an organization's business operations or access proprietary data (including sensitive employee and customer personally identifying information). This risk is especially acute for organizations that rely on large numbers of internally-developed software applications. This in-house software can enable organizations to be more agile and adapt quickly to changing business needs. At the same time however, in-house software can be a source of security vulnerabilities. This can occur where known vulnerabilities are not properly tested for during the development process, or where new vulnerabilities become known after testing and release. Various methodologies exist for scanning of software assets for security vulnerabilities. For example, static code analysis techniques can be used to scan software assets in a repository and report vulnerabilities found. Such reports can be used by software developers to update the software and produce new releases.

Such measures, however, often rely on the software development teams to use the results to modify the software assets. For legacy software assets that are not currently in use, and are not under active development, software vulnerabilities may be detected, but not marked in a way that will be noticed by further teams who choose to build and use the software. One example of this situation is a scenario where a developer requires a specialized library, and chooses to reuse a legacy library that had previously been created for a similar purpose, but is no longer in use or actively maintained. The legacy library may contain software vulnerabilities, which will then be reintroduced into the set of active software assets.

Software vulnerabilities can therefore remain latent in these legacy assets, only to resurface when a legacy asset is brought back into use.

SUMMARY

Embodiments of the present disclosure provide systems and methods for preventing vulnerable software assets from being deployed by modifying the underlying source code in such a way that a build of the software asset will fail.

In one aspect of the present disclosure, a system for securing software artifacts in a repository comprises a repository interface communicably coupleable to a software repository to retrieve an original artifact usable for building a software asset, and to replace the original artifact in the software repository with a modified artifact. A security scanner is configured to initiate a security scan of the original artifact and produce an output indicating the presence of a security vulnerability in the original artifact. An encoder is configured to reversibly modify the original artifact to produce the modified artifact, the modified artifact unusable for building the software asset.

In embodiments, the security scanner is operably coupled to a static analysis tool, and is configured to initiate the security scan by providing the original artifact to the static analysis tool and produce the output indicating the presence of a security vulnerability in the original artifact based on the output of the static analysis tool.

In embodiments, the modified artifact comprises remediation instructions. In embodiments, the modified artifact comprises a Base64 encoding of the original artifact, a compressed copy of the original artifact, and/or an encrypted copy of the original artifact.

In embodiments, the scanner is further configured to receive one or more parameters indicating whitelisted portions of the original artifact, and to not report the presence of security vulnerabilities contained within the whitelisted portions of the original artifact. In embodiments, the parameters are received from a configuration file and/or the original artifact.

In one aspect of the present disclosure, a method for securing software artifacts in a repository includes retrieving, from a software repository, an original artifact usable for building a software asset, initiating a security scan of the original artifact and produce an output indicating the presence of a security vulnerability in the original artifact, reversibly modifying the original artifact to produce a modified artifact, the modified artifact unusable for building the software asset, and replacing the original artifact in the software repository with the modified artifact. In another aspect of the present disclosure a non-transitory computer readable medium stores a program including instructions causing a computer to execute the method for security software artifacts in a repository as described herein.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

Figure 1:
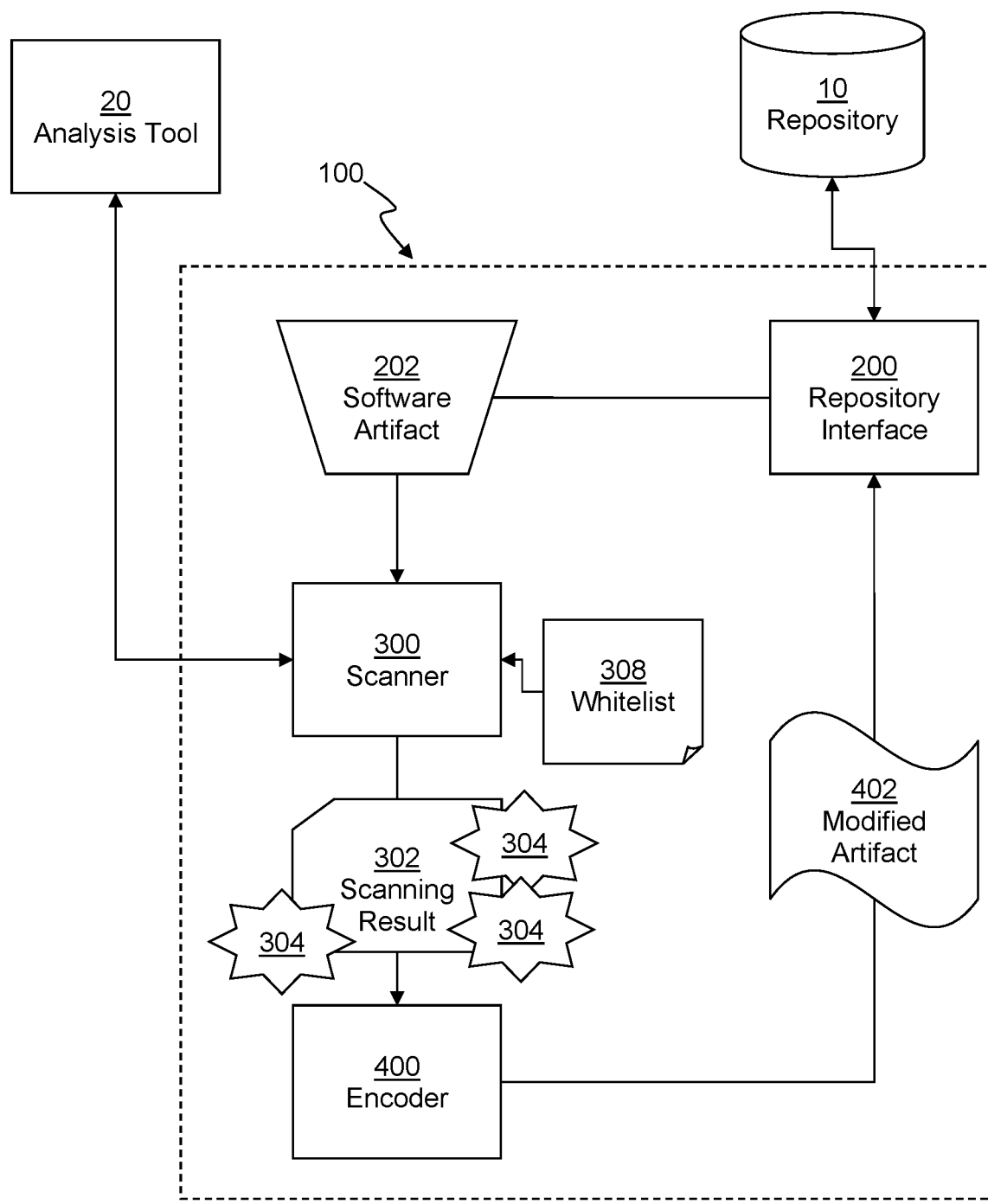
FIG. 1 is a schematic view depicting an architecture of a system for securing software assets in a repository, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

FIG. 1 is a schematic diagram of a system 100 for securing software assets in a repository, according to an embodiment.

Repository interface 200 is operably coupled to one or more repositories 10 to receive software artifacts 202. Repository interface 200 can receive the identification of repository 10. Repository 10 can be identified by a host name, internet protocol (IP) address, uniform resource identifier (URI), or other ID. The identifier can include authentication credentials, such that repository 10 can verify that repository interface 200 is authorized to receive information and/or execute instructions. In embodiments, the identification of repository 10 can be stored in non-volatile memory such as a database, configuration file, or other medium such that repository interface 200 can later retrieve the identification.

Repository interface 200 can be coupled to repository 10 via a provided Web-based, REST, or other application programming interface (API) provided by repository 10. In embodiments, where repository 10 does not provide a programmatic interface, repository interface 200 can produce automated inputs that mimic a human user's interaction with repository 10.

Repository interface 200 can query each repository 10 to discover the set of software artifacts 202. Software artifacts 202 can be useable to build or create one or more software assets, and each software asset may have a plurality of associated software artifacts 202. Software artifacts 202 can be source code, scripts, configuration files, data files, or any other types or formats of data used to create or build one or more software assets. In embodiments, repository interface 200 can filter the set of software artifacts 202 based on one or more criteria. This can enable repository interface 200 to limit the number of software artifacts 202 that are scanned.

Scanner 300 can perform one or more security scans or analyses on software artifacts 202. In embodiments, the security scan can comprise executing, or causing to be executed, one or more analysis tools 20. Analysis tool 20 can be a static code analyzer, or static source code analysis tool, such as IBM Security AppScan, Janus, Checkmarx and/or the like.

Each analysis tool 20 may provide a plug-in, binary executable, or API that can enable scanner 300 to provide software artifacts 202 (either as files, or folder locations) to analysis tool 20 as input, and receive one or more outputs. Scanner 300 can therefore be provided with instructions to interface with the plug-in, binary executable, or API of each analysis tool 20 according to protocols appropriate for the analysis tool 20 to provide software artifacts 202 and receive scanning result 302.

In embodiments, the scanner 300 can execute one or more dynamic tests by running a software asset in a controlled environment (such as a virtual machine), and running one or more test suites. Scanner 300 therefore can perform operations, including combinations of static and dynamic analysis operations.

Figure 2:
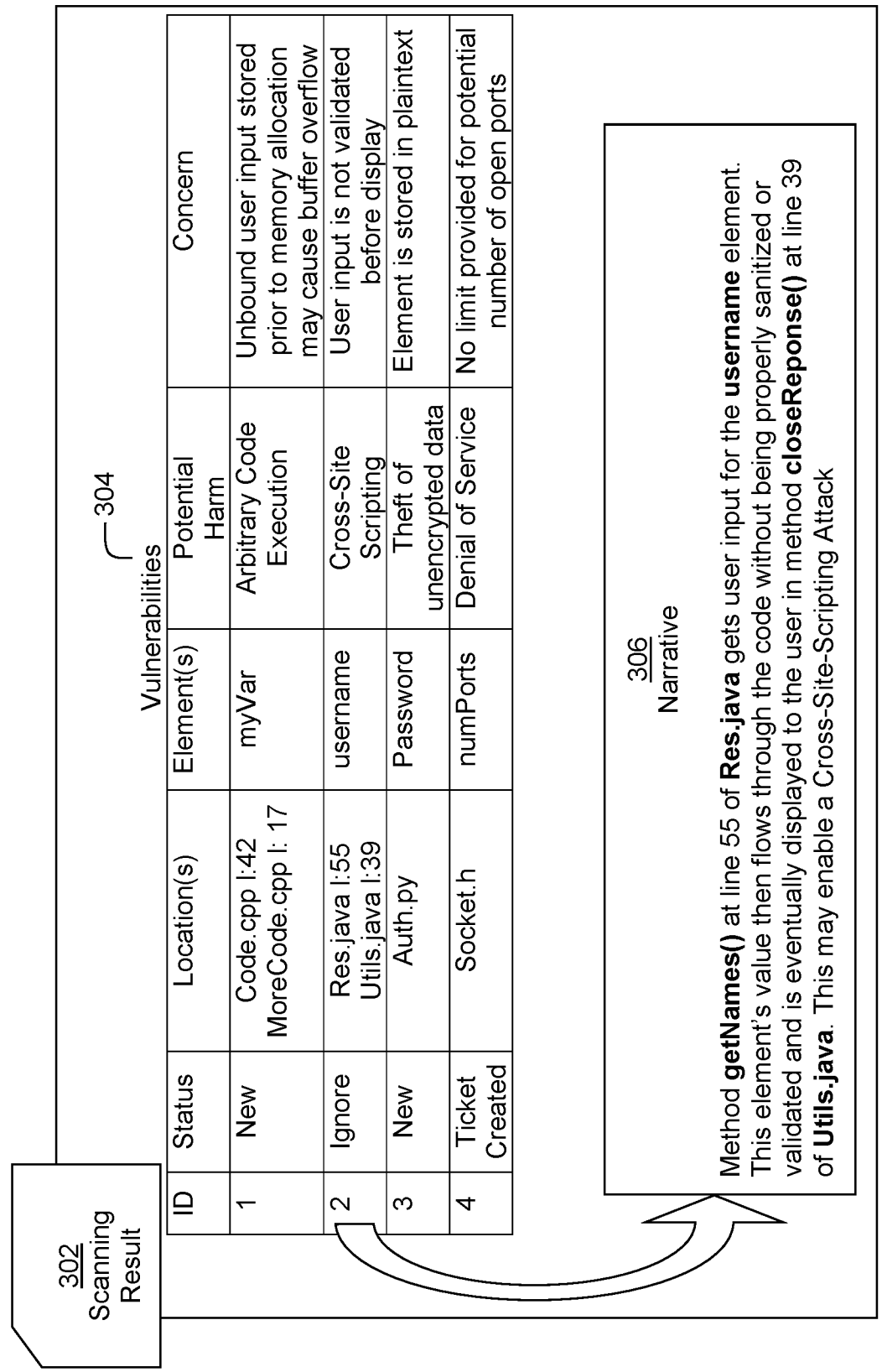
FIG. 2 is a schematic view depicting example results of a security scan as may be used by an embodiment.
Figure 3:
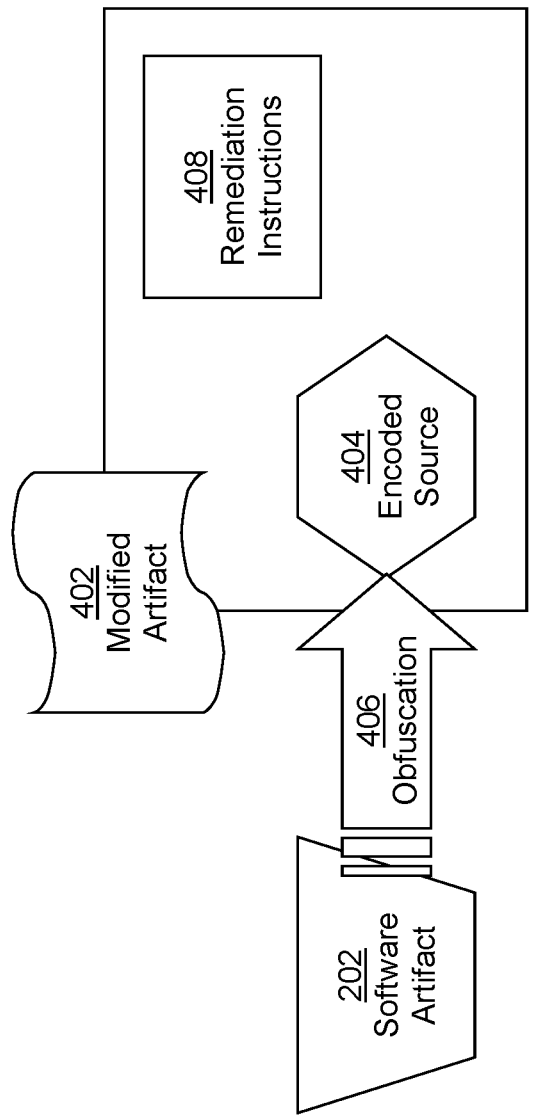
FIG. 3 is a schematic view depicting the creation and elements of a modified artifact, according to an embodiment.

FIG. 2 is a schematic view depicting a data structure for elements of scanning results 302 as can be generated by scanner 300, according to an embodiment. Scanning result 302 may include the identification of one or more vulnerabilities 304.

Scanning result 302 can comprise one or more of Extensible Markup Language (XML), JavaScript Object Notation (JSON), or other files or outputs indicating the results of the security scan. Example vulnerabilities 304 are depicted in tabular form in FIG. 2, though other storage arrangements can be employed by the various embodiments. Each vulnerability 304 can comprise an identifier (or ID) field, which can be unique across all scanning results 302. A status field can enable user, administrator, or programmatic update of the current status of the concern.

One or more location fields can each comprise the identification and/or storage location of the software artifact 202 and the line number(s) or other location indicator of the software artifact 202 that correspond to the vulnerability 304. An elements field can identify elements, such as variables, or other data items, that are associated with the vulnerability 304. A potential harm field can identify one or more harms that could result from this vulnerability 304, for example, arbitrary code execution, cross-site scripting, denial of service, or the like. A concern field can further describe how the harm could be caused, for example, by indicating that user input is not validated before display. Each vulnerability 304 can further be associated with a narrative 306. Narrative 306 can be a text based summary of the vulnerability 304 and can be stored with scanning results 302. Scanning results 302 can include more, fewer, or different data times in embodiments.

In embodiments, scanner 300 can receive whitelist 308. Whitelist 308 can comprise parameters or other configuration data identifying artifacts 202 or portions of artifacts 202 to be ignored for vulnerability encoding purposes. Scanner 300 can be configured to receive whitelist 308 through one or more configuration files, command line interfaces, or graphical user interfaces. Scanner 300 can further be configured to receive whitelist 308 from within software artifact 202 itself. For example, software artifacts 202 can be annotated to include comments, directives, pragmas, or other markers to indicate the beginning and end of portions of software artifacts 202 that should not be encoded, even if scanning indicates vulnerabilities.

Whitelist 308 can enable software developers to highlight false positive results, where scanner 300 or analysis tool 20 may detect vulnerabilities that may not present risk when in actual use. In embodiments, whitelist 308 can be used to identify portions of software artifacts 202 to not be scanned at all, or can be used as a filter for scanning results 302, such that whitelisted vulnerabilities are either not received by encoder 400 or not encoded by encoder 400. Consider, for the sake of example, the code snippet in the C programming language provided in Table 1 below.

TABLE 1

```
1:      void storeAnswerForAllMonths(float myArray[ ]) {
2:          if(has12months(myArray[ ]) {
3:              /* Security Scan – SKIP START */
4:              for (i=0;i<12;i++) {
5:                  myArray[i]=42.0;
6:              }
7:              /* Security Scan – SKIP STOP */}
8:          }
9:      }
```

Scanner 300, and/or analysis tool 20, may report a potential buffer overflow at line 5, caused by writing a value to myArray[i] without allocating memory first.

The developer, however, may be aware that the has12months( )function call at line 2 has been validated to ensure that myArray[i] has sufficient memory allocated for at least twelve floating point values. The markers at lines 3 and 7 can instruct scanner 300 suppress the reporting of security vulnerability at line 5, either by not scanning that portion, or by filtering scanning results 302 to remove any vulnerabilities reported between lines 3 and 7.

Encoder 400 can receive scanning result 302, and produce modified artifacts 402 based on software artifacts 202 that are associated with vulnerabilities 304 in scanning results 302. Modified artifact 402 can comprise encoded source 404. Encoded source 404 can comprise an copy of the content of original software artifact 202 as modified by an obfuscation technique 406. Modified artifact 402 can further comprise remediation instructions 408.

Obfuscation technique 406 can comprise any technique for converting software artifact 202 to a version that cannot be used to build a software asset. In other words, obfuscation technique 406 can be an algorithm, method, or scheme to break or lock the software asset. In embodiments, obfuscation technique is reversible, such that software artifact 202 can be recovered from encoded source 404. In embodiments, obfuscation technique 406 can be a non-cryptographic transformation of software artifact 202. For example, obfuscation technique 406 can comprise applying an encoding scheme such as Base64, performing a substitution cipher such as ROT13, or compressing software artifact 202. Obfuscation technique 406 can also comprise encrypting software artifact 202 using public or private key cryptographic methods known in the art, such as Advanced Encryption Standard (AES), or elliptic-curve cryptography (ECC). In embodiments, obfuscation technique 406 can be applied to the entire software artifact 202, or to portions of software artifact 202. For example, where a vulnerability 304 is detected within a certain function or subroutine within a source file, only the vulnerable function is encoded in embodiments.

Remediation instructions 408 can be provided with encoded source 404 in modified artifact 402. Remediation instructions 408 can provide an explanation of why software artifact 202 was encoded, as well as explaining how to decode encoded source 404.

For example, where encryption is used, the decryption key, or instructions for deriving the decryption key can be provided with remediation instructions 408. Remediation instructions 408 can also provide narrative 306, if provided with scanning results 302. Remediation instructions 408 can further describe how to report and/or indication false positive results, including by specifying the location and format for whitelist 308.

Remediation instructions 408 can be verbose, including all information regarding vulnerability 304 and obfuscation technique 406. Remediation instructions can also comprise, or be supplemented by a universal resource locator (URL), universal resource name (URN), universal resource identifier (URI) or other link to a data store including more detailed information.

In embodiments, remediation instructions 408 can be inserted within encoded source 404 (for example, at the beginning or end of encoded source 404, or proximate the obfuscated portion of encoded source 404). Remediation instructions 408 can alternatively be provided as a file separate from encoded source 404. In embodiments, modified artifact 402 can therefore comprise separate encoded source 404 and remediation instructions 408 files. Modified artifact 402 can also comprise a single archive file in which encoded source 404 and remediation instructions 408 have been joined. For example, modified artifact 402 can comprise an archive file in a ZIP, GNU zip (gzip), tape archive file (TAR), gzip, Roshal Archive (RAR) format (or any other archive format) including both encoded source 404 and remediation instructions 408 (for example in a README.txt file).

In embodiments, modified artifact 402 can have the same file name or other identifier as software artifact 202, regardless of the format of modified artifact 402. For example, a software artifact named "main.cpp" can be obfuscated by compressing into a ZIP file format (with, or without remediation instructions 408), modified artifact 402 can retain the name "main.cpp," so that modified artifact 402 is used in lieu of the original software artifact 202 during build processes. Modified artifact 402 can be provided to repository interface 200 for upload to repository 10.

Embodiments of the present disclosure can be executed on single computing systems, or in cloud, or other parallel processing architectures.

Figure 4:
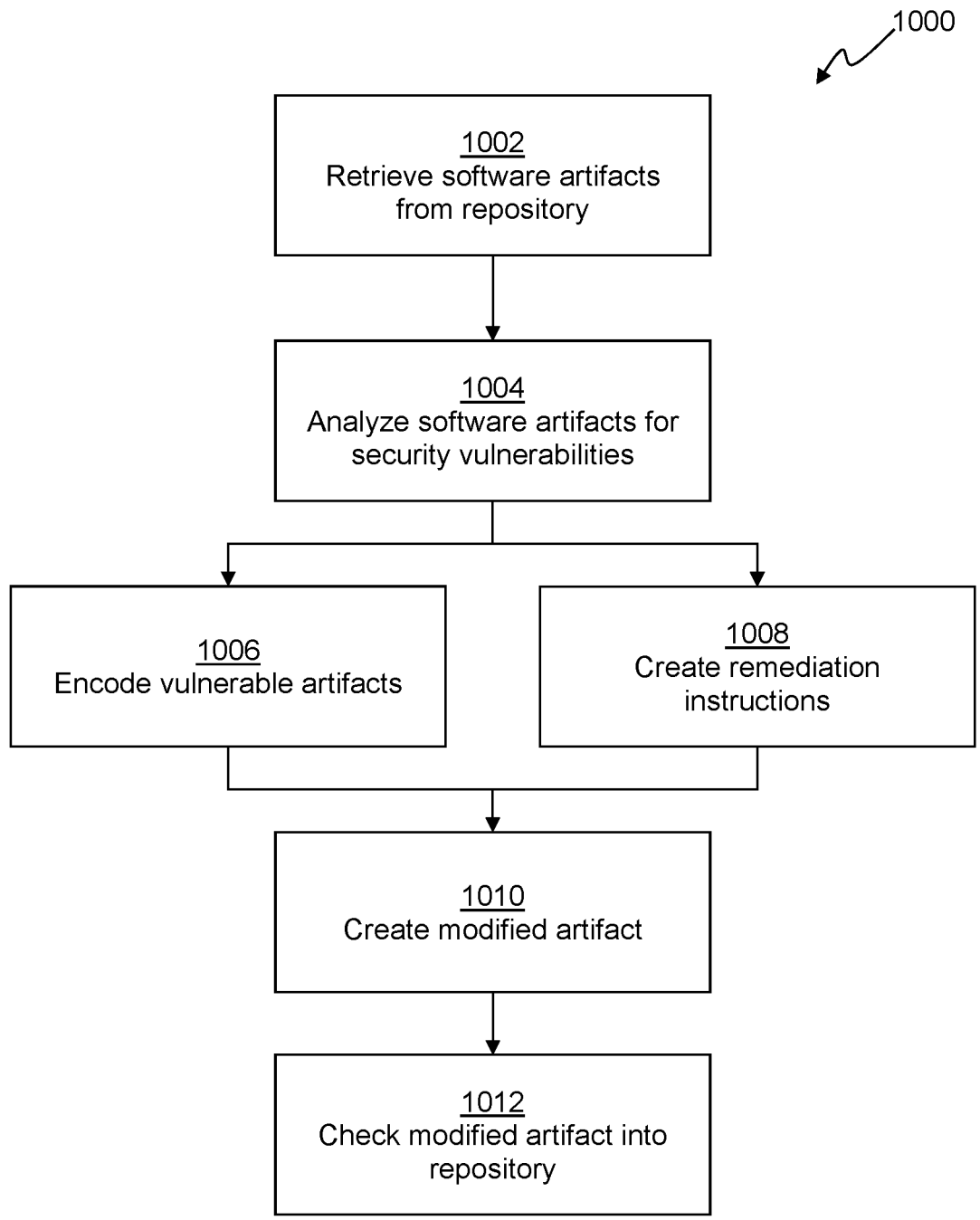
FIG. 4 is a flowchart depicting a method for securing software assets in a repository, according to an embodiment.

FIG. 4 is a flowchart depicting a method 1000 for security software artifacts in a repository. At 1002, one or more software artifacts can be retrieved from the repository. At 1004 the software artifacts can be analyzed or scanned for security vulnerabilities, for example by a static code analyzer, or by performing one or more active tests to produce scanning results.

At 1006, artifacts identified as including vulnerabilities can be encoded. In embodiments, a whitelist can be checked before encoding to detect any expect false positives. At 1008, remediation instructions can be generated. At 1010, the encoded source code and the remediation instructions can be combined to create one or more modified artifacts. At 1012, the modified artifacts can be checked-in, uploaded, or otherwise provided to the repository.

Figure 5:
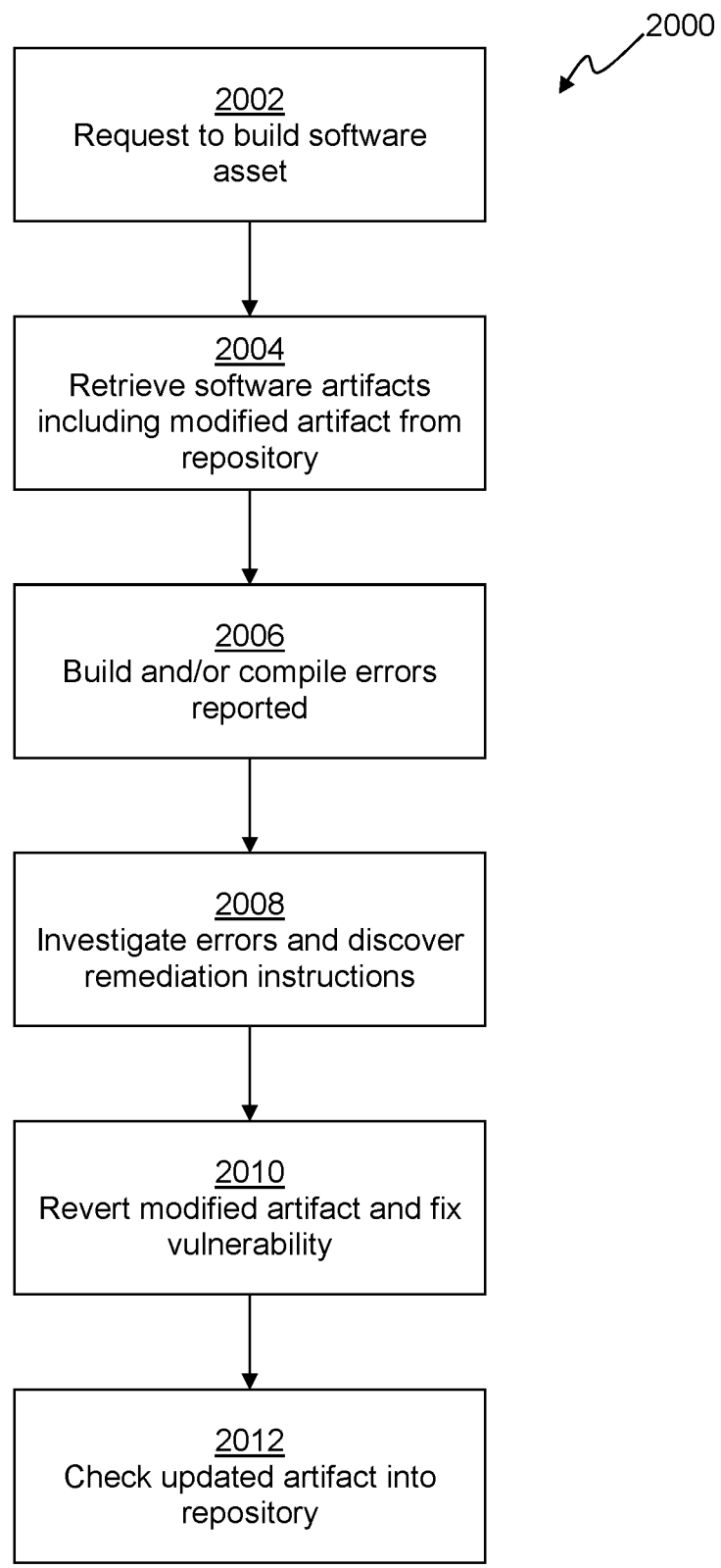
FIG. 5 is a flowchart depicting a method for discovering and mitigating vulnerable software artifacts, according to an embodiment.

FIG. 5 is a flowchart depicting a method 2000 for discovering security vulnerabilities within an asset, according an embodiment. Method 2000 can be executed or implemented substantially automatically, though portions may be executed by a user such as a software developer. At 2002, a request to build a software asset can be made, for example, to or via an automated build system such as Jenkins or AntHillPro. At 2004, the software artifacts necessary to build the software asset can be retrieved from a repository. If security vulnerabilities were previously identified (for example by execution of method 1000) the retrieved software artifacts will include one or more modified artifacts. At 2006, build or compile errors will be reported by the build tool. For example, source code files that have been modified by being compressed, or translated using a Base64 scheme will fail to compile.

At 2008, the errors can be investigated and the remediation instructions can be discovered. For example, a user may find the remediation instructions in a header or beginning portion of a modified artifact. In some embodiments, the build tool can be configured to report remediation instructions with the build errors. The report including remediation instructions can be communicated directly to the user, for example, through the user interface, or through one or more communication systems such as email or text messaging.

At 2010, the modified artifact can be reverted, and changes made to mitigate or fix the vulnerability. Depending on the nature of the vulnerability, the software artifact can be updated to remove bugs or other errors in the code, or a whitelist entry can be made to indicate a false positive. It is appreciated as part of the present disclosure that the updates the software artifact can be performed manually by a developer, or automatically, where the remediation instructions provide sufficient detail. At 2012, the updated artifact can be returned to the repository.

Embodiments of the present disclosure present a number of advantages over conventional systems, some of which are described herein. Automated security scanning can occur as part of, or asynchronously with, the development process. Because modified artifacts 402 replace the original software artifacts 202 in repository 10, software assets cannot be built or compiled using artifacts 202 that are detected to contain software vulnerabilities. Potential users of software, including legacy software, are therefore prevented from introducing known security issues into production or other deployed environments. While multiple instances of scanner 300 or encoder 400 can be deployed, only a single repository interface module or engine requires access to software repository 10, therefore enabling the security of authentication parameters to be encapsulated.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

In one embodiment, the system 100 and/or its components or subsystems can include computing devices, microprocessors, modules and other computer or computing devices, which can be any programmable device that accepts digital data as input, is configured to process the input according to instructions or algorithms, and provides results as outputs. In one embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In one embodiment, volatile memory can include random access memory (RAM), dynamic random access memory (DRAM), or static random access memory (SRAM), for example. In one embodiment, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In one embodiment, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Moreover, reference in the specification to "one embodiment," "an embodiment," or "some embodiments" means that a particular feature, structure, or characteristic, described in connection with the embodiment, is included in at least one embodiment of the teaching. The appearances of the phrase "in one embodiment" in various places in the specification are not necessarily all referring to the same embodiment.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

What is claimed is:

1. A system for securing software artifacts in a repository comprising:
    computing hardware of at least one processor and a memory operably coupled to the at least one processor; and
    instructions that, when executed on the at least one processor, cause the at least one processor to implement:
        a repository interface communicably coupleable to a software repository to retrieve an original artifact usable for building a software asset, and to replace the original artifact in the software repository with a modified artifact;
        a security scanner configured to initiate a security scan of the original artifact and produce an output indicating the presence of a security vulnerability in the original artifact; and
        an encoder configured to reversibly modify the original artifact to produce the modified artifact, the modified artifact unusable for building the software asset.

2. The system of claim 1, wherein the security scanner is operably coupled to a static analysis tool, and is configured to initiate the security scan by providing the original artifact to the static analysis tool and produce the output indicating the presence of a security vulnerability in the original artifact based on the output of the static analysis tool.

3. The system of claim 1, wherein the modified artifact comprises remediation instructions.

4. The system of claim 1, wherein the modified artifact comprises an encoding of the original artifact using an encoding scheme selected from the group consisting of: Base64 and ROT13.

5. The system of claim 1, wherein the modified artifact comprises a compressed copy of the original artifact.

6. The system of claim 1, wherein the modified artifact comprises an encrypted copy of the original artifact.

7. The system of claim 1, wherein the security scanner is further configured to receive one or more parameters indicating whitelisted portions of the original artifact, and to not report the presence of security vulnerabilities contained within the whitelisted portions of the original artifact.

8. The system of claim 7, wherein the one or more parameters are received from a configuration file.

9. The system of claim 7, wherein the one or more parameters are received from the original artifact.

10. A method for securing software artifacts in a repository comprising:
    retrieving, from a software repository, an original artifact usable for building a software asset;
    initiating a security scan of the original artifact and producing an output indicating the presence of a security vulnerability in the original artifact;
    reversibly modifying the original artifact to produce a modified artifact, the modified artifact unusable for building the software asset; and
    replacing the original artifact in the software repository with the modified artifact.

11. The method of claim 10, wherein initiating the security scan comprises providing the original artifact to a static analysis tool; and
    wherein the output indicating the presence of a security vulnerability in the original artifact is produced based on the output of the static analysis tool.

12. The method of claim 10, wherein the modified artifact comprises remediation instructions.

13. The method of claim 10, wherein the modified artifact comprises an encoding of the original artifact using an encoding scheme selected from the group consisting of: Base64 and ROT13.

14. The method of claim 10, wherein the modified artifact comprises a compressed copy of the original artifact.

15. The method of claim 10, wherein the modified artifact comprises an encrypted copy of the original artifact.

16. The method of claim 10, wherein the security scanner is further configured to receive one or more parameters indicating whitelisted portions of the original artifact, and to not report the presence of security vulnerabilities contained within the whitelisted portions of the original artifact.

17. The method of claim 16, wherein the one or more parameters are received from a configuration file.

18. The method of claim 16, wherein the one or more parameters are received from the original artifact.

19. A non-transitory, computer-readable medium storing instructions capable of causing a computer to execute a method for securing software artifacts in a repository, the method comprising:
    retrieving, from a software repository, an original artifact usable for building a software asset;
    initiating a security scan of the original artifact and producing an output indicating the presence of a security vulnerability in the original artifact;
    reversibly modifying the original artifact to produce a modified artifact, the modified artifact unusable for building the software asset; and
    replacing the original artifact in the software repository with the modified artifact.

* * * * *